US012712234B2

(12) United States Patent
Kim

(10) Patent No.: US 12,712,234 B2
(45) Date of Patent: Aug. 18, 2026

(54) BATTERY MODULE

(71) Applicants: Hyundai Motor Company, Seoul (KR); Kia Corporation, Seoul (KR)

(72) Inventor: Bum Jin Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 743 days.

(21) Appl. No.: 18/100,389

(22) Filed: Jan. 23, 2023

(65) Prior Publication Data

US 2024/0063496 A1 Feb. 22, 2024

(30) Foreign Application Priority Data

Aug. 22, 2022 (KR) ........................ 10-2022-0104816

(51) Int. Cl.

| | |
|---|---|
| ***H01M 50/291*** | (2021.01) |
| ***H01M 10/48*** | (2006.01) |
| ***H01M 50/213*** | (2021.01) |
| ***H01M 50/262*** | (2021.01) |
| ***H01M 50/264*** | (2021.01) |
| ***H01M 50/271*** | (2021.01) |
| ***H01M 50/503*** | (2021.01) |
| ***H01M 50/507*** | (2021.01) |

(52) U.S. Cl.

CPC ....... *H01M 50/291* (2021.01); *H01M 10/486* (2013.01); *H01M 50/213* (2021.01); *H01M 50/262* (2021.01); *H01M 50/264* (2021.01); *H01M 50/271* (2021.01); *H01M 50/503* (2021.01); *H01M 50/507* (2021.01)

(58) Field of Classification Search

None

See application file for complete search history.

(56) References Cited

U.S. PATENT DOCUMENTS

| | | | | |
|---|---|---|---|---|
| 6,287,150 B1 * | 9/2001 | Oda ...................... | H01M 50/50 | 439/627 |
| 6,465,123 B1 * | 10/2002 | Baumann ............ | H01M 10/643 | 429/96 |
| 2008/0124618 A1 * | 5/2008 | Shimoyama ........ | H01M 50/213 | 429/99 |
| 2021/0098765 A1 * | 4/2021 | Weinberger ......... | H01M 50/519 | |

FOREIGN PATENT DOCUMENTS

KR 10-2018-0081393 A 7/2018

* cited by examiner

*Primary Examiner* — Jonathan Crepeau

(74) *Attorney, Agent, or Firm* — Banner & Witcoff, Ltd.

(57) ABSTRACT

A battery module may comprise a lower casing configured to accommodate battery cells adjacent to each other and restrain opposite ends of the battery cells. Busbars may be provided in the lower casing and may be configured to form an electrical connection between the battery cells accommodated in the lower casing. The battery module may comprise an upper casing that may be coupled to the lower casing such that the upper casing and lower casing may be configured to enclose battery cells accommodated inside the lower casing.

15 Claims, 10 Drawing Sheets

BATTERY MODULE

CROSS-REFERENCE TO RELATED APPLICATION

The present application claims priority to Korean Patent Application No. 10-2022-0104816, filed on Aug. 22, 2022, the entire contents of which are incorporated herein for all purposes by this reference.

BACKGROUND

A battery module may be configured to provide a desired electrical output by combining outputs of multiple battery cells.

A battery module for combining multiple cylindrical battery cells may face problems of difficult and/or unstable installation of the cylindrical battery cells in the battery module. The battery cells may discharge a gas during use, which may become trapped in the battery module. It is preferable that the assembly of the battery module be achieved simply and with few parts.

The foregoing is intended merely to aid in the understanding of the background of the present invention, and is not meant to indicate any related art that is already known to those skilled in the art.

SUMMARY

The following summary presents a simplified summary of certain features. The summary is not an extensive overview and is not intended to identify key or critical elements.

Systems, apparatuses, and methods are described for a battery module and assembly thereof. A battery module may comprise a lower casing configured to accommodate battery cells in the lower casing such that a side of each battery cell is adjacent to a side of another battery cell and ends of the battery cells are restrained by a side wall of the lower casing; busbars provided at the side wall of the lower casing and configured to form an electrical connection between the battery cells when the battery cells are accommodated in the lower casing; and an upper casing configured to be coupled to the lower casing so as to form an internal space for accommodating the battery cells inside the lower casing. The lower casing may comprise gap-maintaining ribs configured to maintain gaps between adjacent sides of the battery cells when the battery cells are accommodated inside the lower casing.

Also, or alternatively, a method of assembling a battery module may comprise inserting battery cells into a lower casing, wherein the lower casing comprises gap-maintaining ribs configured to orient and position the inserted battery cells such that a side of each battery cell is adjacent to a side of another battery cell with a gap between the adjacent sides and such that terminals of the battery cells contact busbars provided at a side wall of the lower casing; and coupling an upper casing to the lower casing such that the upper casing covers outer side wall surfaces of the lower casing.

These and other features and advantages are described in greater detail below.

DETAILED DESCRIPTION

Figure 1:
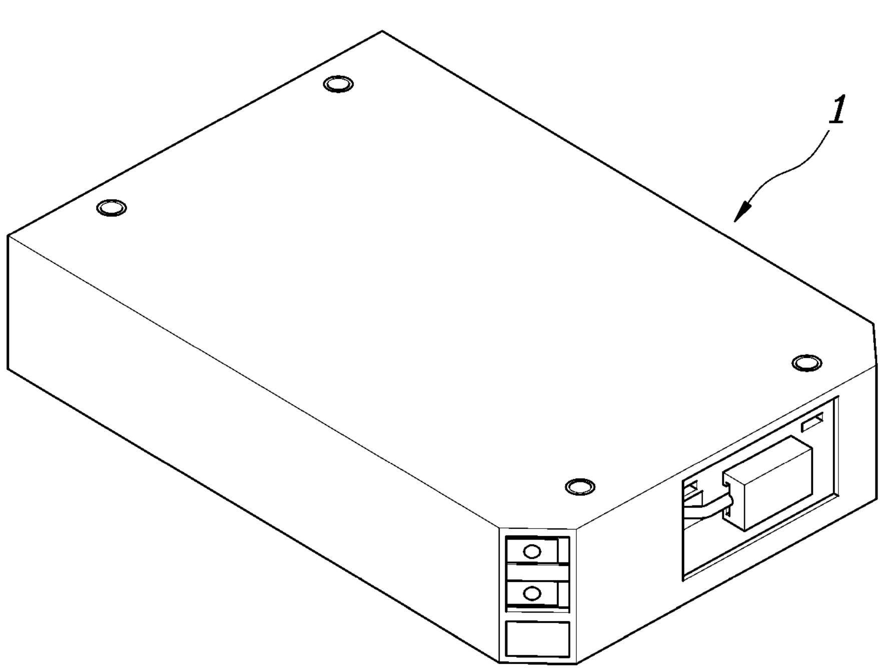
FIG. 1 is a view showing a structure of a battery module according to the present disclosure.
Figure 2:
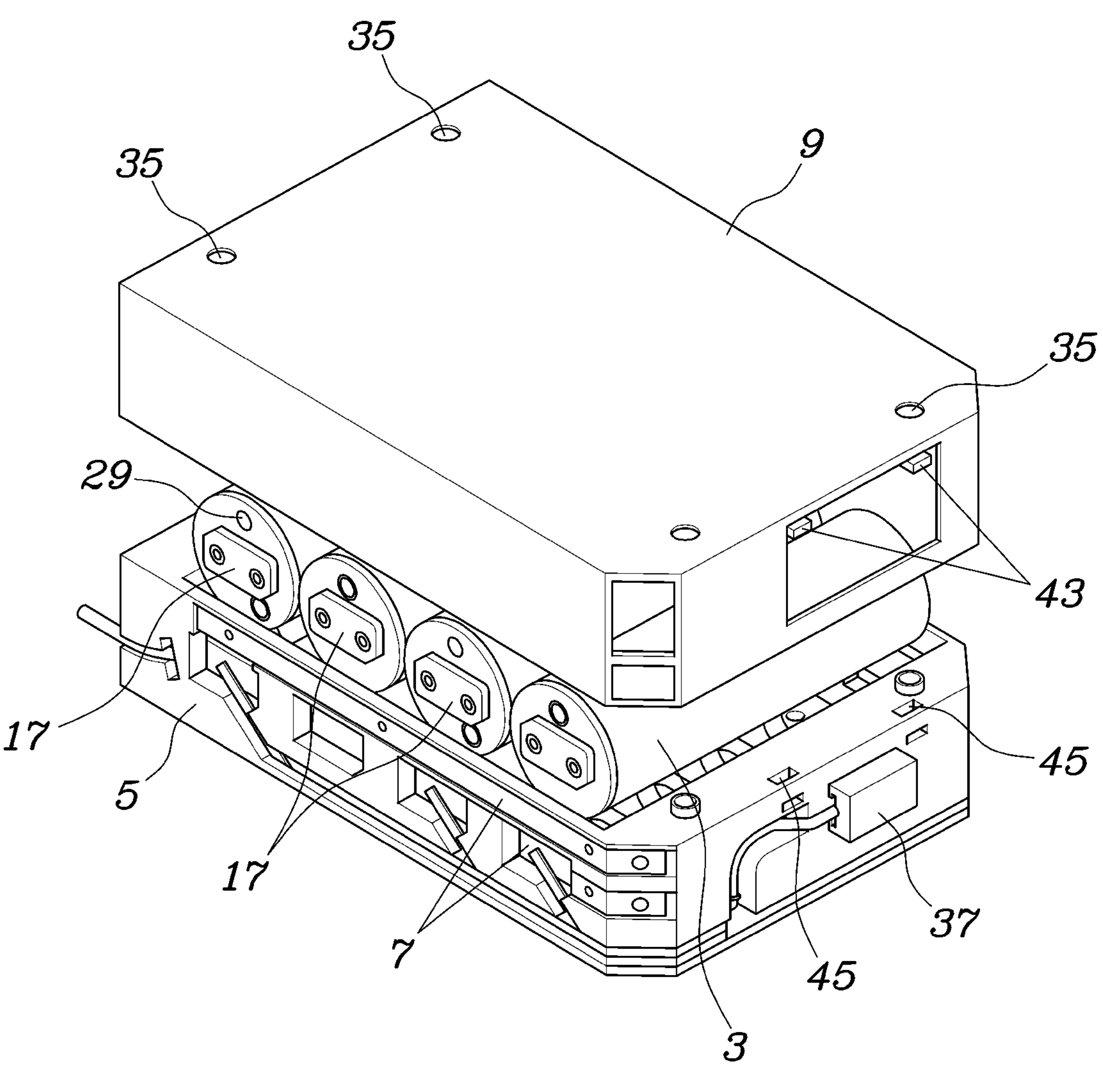
FIG. 2 is an exploded-perspective view showing the battery module of FIG. 1.
Figure 3:
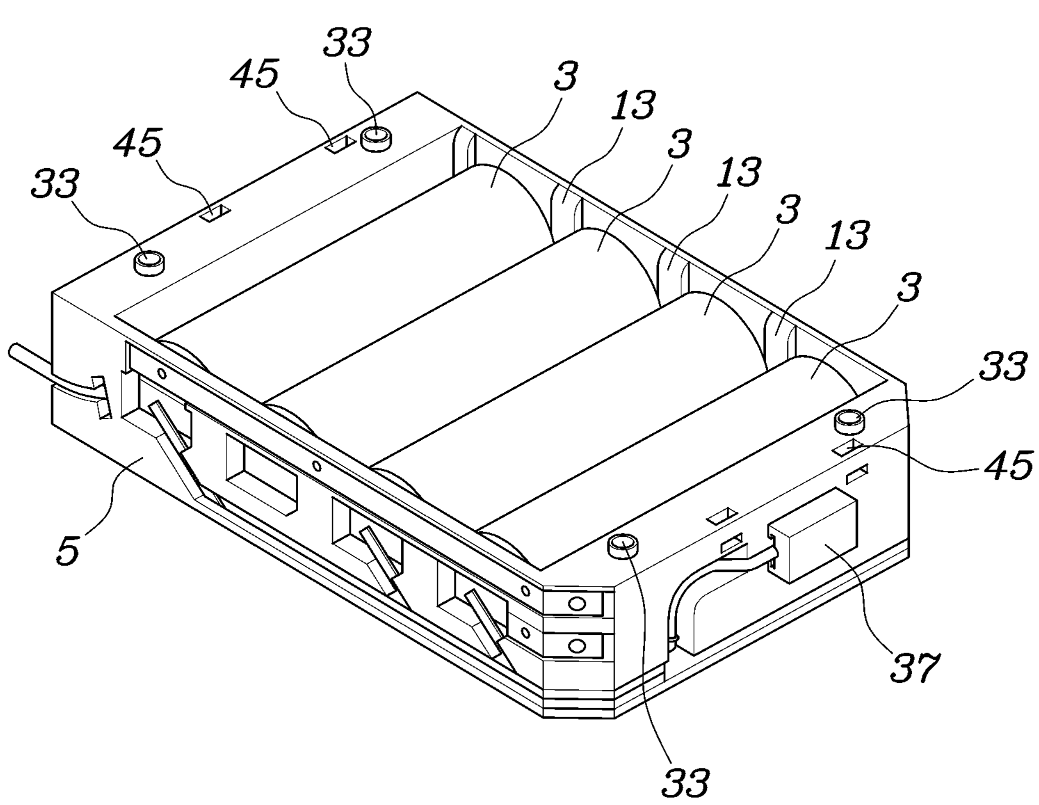
FIG. 3 is a view showing a state in which an upper casing is removed from the battery module in FIG. 1.
Figure 4:
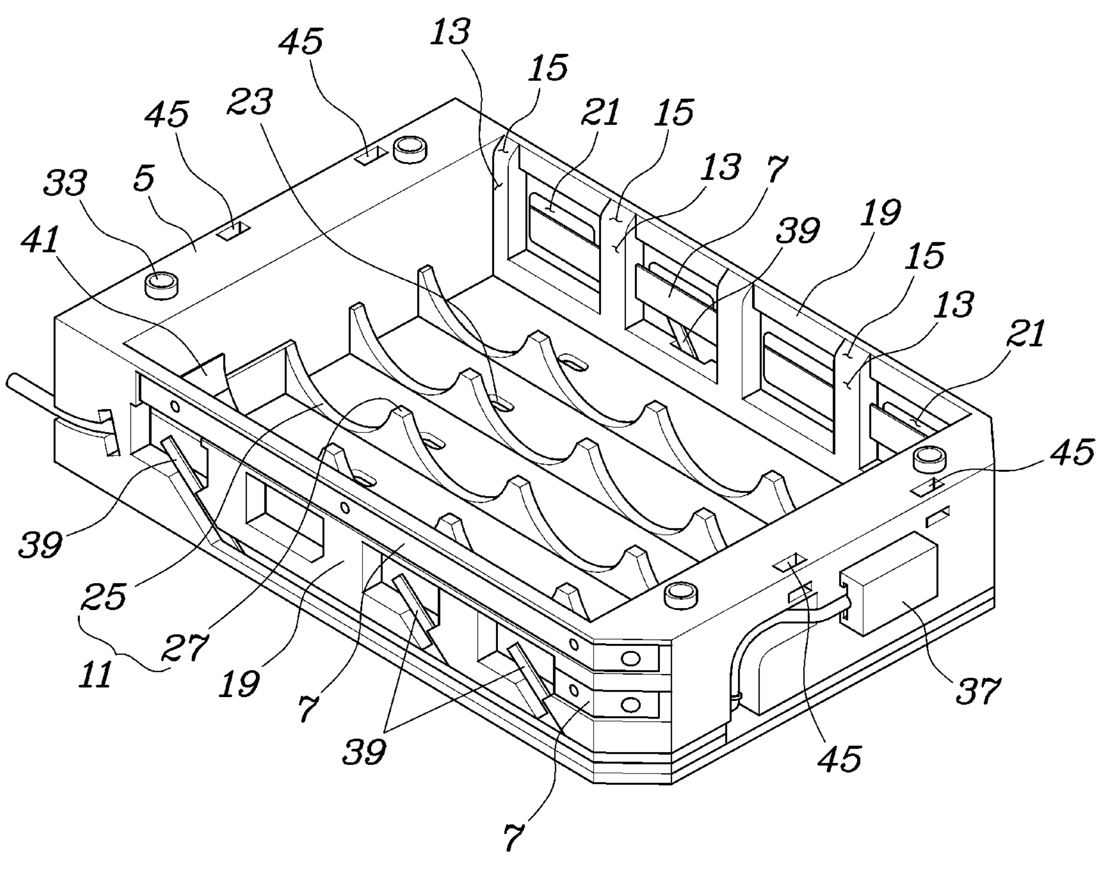
FIG. 4 is a view showing a lower casing of the battery module in FIG. 1.

Hereinbelow, an example of the present subject matter will be described in detail with reference to the accompanying drawings. The same reference numerals will refer to the same or like parts, and redundant descriptions thereof will be omitted.

The terms "module" and "part" in the following description are used throughout with consideration only of the ease and clarity of writing, and do not have distinct meanings or roles by themselves, unless specified herein.

Detailed descriptions of known functions or configurations are omitted if such description would make the subject matter unclear. The accompanying drawings are only for understanding the present disclosure, and the technical ideas disclosed in the specification are not limited by the accompanying drawings. Those skilled in the art will appreciate that various modifications, additions and/or substitutions are possible, without departing from the scope and spirit of present subject matter.

The terms "first," "second," etc. may be used herein to describe various elements. These terms are only used to distinguish one element, from another element and do not indicate an order or otherwise limit the elements. The terms "upper," "lower", "up," "down," "vertical," etc., refer to directions with respect to the figures and do not otherwise limit the elements. "Horizontal" refers to a direction orthogonal to "vertical."

An element being "connected to" or "coupled to" another element may indicate that the element is connected directly to or coupled directly to the other element, or that the element is connected indirectly to or coupled indirectly to the other element (e.g., having yet another element intervening between the element and the other element). On the other hand, when one element is referred to as being "connected directly to" or "coupled directly to" another element, the element is connected to or coupled to the other element without any other element intervening therebetween, except for, possibly, a connection means, such as a wire, a joint, a weld, etc.

Singular forms are intended to include plural forms unless the context clearly indicates otherwise.

It will be further understood that the terms "comprises," "includes," or "has," in this specification, specify the presence of stated features, steps, operations, components, parts, or a combination thereof, but do not preclude the presence or addition of one or more other features, steps, operations, components, parts, or a combination thereof.

Referring to FIGS. 1 to 10, according to an example of the present disclosure, a battery module 1 includes: a lower casing in which battery cells 3 may be accommodated adjacent to each other (e.g., accommodated such that, for each of the battery cells 3, a side of the battery cell 3, such as a cylindrical side of a cylindrical battery cell, is adjacent to a side of another battery cell 3). The lower casing 5 may be configured to restrain the battery cells 3 from moving relative to each other, e.g., by restraining ends of battery cells 3 when the battery cells are accommodated in the lower casing 5. Busbars 7 may be provided in the lower casing 5 and may be configured to provide an electrical connection between the battery cells 3 when the battery cells 3 are accommodated in the lower casing 5. The battery module 1 may comprise an upper casing 9 configured to couple to the lower casing 5 such that, when the upper casing 9 is coupled to the lower casing 5, the battery module 1 is configured to enclose battery cells 3 accommodated inside the lower casing 5.

Furthermore, the lower casing 5 may comprise gap-maintaining ribs 11, which may be attached to and/or integrally formed with the lower casing 5, and which may be configured to maintain gaps between the sides (e.g., cylindrical sides) of the battery cells 3 accommodated inside the lower casing.

The lower casing 5 may be configured to orient and arrange battery cells 3 accommodated inside the lower casing 5 such that, for each of the battery cells 3, a side of the battery cell 3 (e.g. a side without an electrode terminal and/or adjacent to an end with an electrode terminal) is adjacent to a side of another battery cell 3. Additionally, the lower casing may be configure to restrain, for each of the battery cells 3, opposing ends of the battery cell 3 (e.g., an end comprising an electrode terminal and/or an end opposite thereto). In particular, the lower casing 5 may provide structure such as side walls that keep battery cells 3 from being able to move past each other. The lower casing 5 may be configured to accommodate battery cells 3 oriented and arranged such that electrode terminals of the battery cells 3 may be brought into contact with the busbars 7 provided at the lower casing 5. Thus an electrical connection between the battery cells may be achieved and the gap-maintaining ribs 11 may orient and arrange the battery cells 3 to have gaps between the adjacent sides of adjacent battery cells 3.

On a side wall of the lower casing 5 configured to restraining the opposing ends of the battery cells 3, vertical ribs 13 may be provided that protrude inward into the inner casing 5 from the side wall. The vertical ribs 13 may extend vertically along the side wall from a bottom wall of the lower casing 5 in vertically long shapes that are configured to correspond to gaps between the battery cells 3 accommodated in the lower casing 5. Upper portions of the vertical ribs 13 are formed into inclined surfaces 15 of the vertical ribs 13 that are inclined away from the side wall in a direction towards the bottom wall. Thus, the inclined surfaces 15 of the vertical ribs 13 are configured to guide ends of battery cells 3 being inserted into the lower casing 5 toward an inside space formed by the lower casing 5 (e.g., away from the side wall as the battery cell is lowered into the lower casing 5).

Each of the vertical ribs 13 may have locations corresponding to locations between and/or to a side of electrodes 17 of the battery cells 3 when the battery cells are accommodated in the lower casing 5. The electrodes 17 may protrude in a longitudinal direction from at least one end of the battery cells 3.

Figure 5:
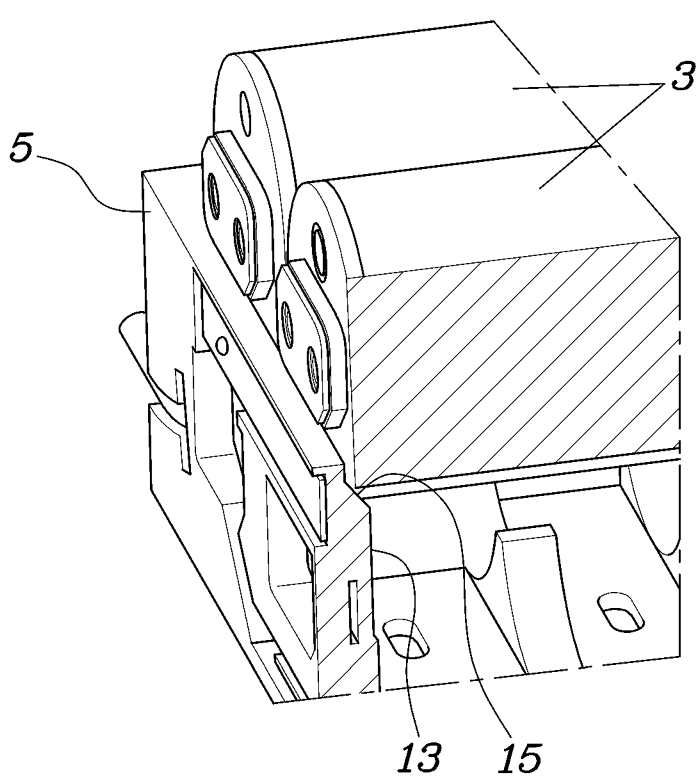
FIG. 5 is a sectional view showing a situation in which a battery cell is guided by an inclined surface of a vertical rib.

Therefore, when the battery cells 3 are inserted into the lower casing 5 in a top to down direction, as shown in FIG. 5, ends of the battery cells 3 may be guided toward the inside space of the lower casing 5 by the inclined surfaces 15 of the vertical ribs 13, which improves the ease of assembling (e.g., inserting) the battery cells 3 in the lower casing 5.

Specifically, arranging the vertical ribs 13 being arranged between where the electrodes 17 of adjacent battery cells 3 would be when the battery cells 3 are accommodated in the lower casing 5, causes the electrodes 17, which may protrude from one or more of the ends of the battery cell 3, to be guided toward the inside space of the lower casing 5 (e.g., away from the side wall), and/or to be guided toward the busbars 7 (e.g., to make contact with the busbars 7). Further, the vertical ribs arranged as above may facilitate insertion of the battery cells 3 into a correct position (e.g., with adjacent sides in alignment and with a gap therebetween) in the lower casing 5.

The busbars 7 may be configured to make electrical contact with the ends of the battery cells 3. Multiple busbars 7 may be arranged on the side wall 19 of the lower casing 5. Upper portions of the busbars 7 may comprise inclined surfaces 21 of the busbars 7. The inclined surfaces 21 of the busbars 7 may be configured (e.g., formed with an angle and be positioned at a height on the side wall 18) so that, for battery cells 3 being inserted in the lower casing 5, the electrodes 17 of the battery cells 3 are guided (e.g., pushed while sliding along the inclined surfaces 21) toward an inside space of the lower casing 5 by the inclined surfaces 21 of the busbars 7.

The inclined surfaces 21 of the busbars 7 may be located lower than the inclined surfaces 15 of the vertical ribs 13.

Therefore, as the battery cells 3 are inserted into the inner casing 5, the battery cells 3 are guided by the inclined surfaces 15 of the vertical ribs 13, and the electrodes 17 are guided by the inclined surfaces 21 of the busbars 7. The inclined surfaces 15 of the vertical ribs 13 and the inclined surfaces 21 of the busbars 7 may thereby facilitate insertion of the battery cells 3 in a correct arrangement (e.g., aligned with gaps between adjacent sides, with restrained ends and electrodes 17 electrically connected by busbars 7).

Each of the inclined surfaces 21 of the busbars 7 may be formed by bending an upper portion of each of the busbars 7 such that the upper portion is inclined toward, in an upward direction, the side wall 19 of the lower casing 5.

Furthermore, a lower portion of each of the inclined surfaces 21 of the busbars 7 may be arranged so as to be configured to, as the electrodes 17 of the battery cells 3 move downward along the inclined surfaces 21 of the busbars 7, a lower portion (e.g., a non-inclined portion and/or the inclined surface 21) of the busbar is elastically displaced toward the side wall 19 while being brought in contact with the electrode 17. The lower portion may be configured to make contact with (e.g., make direct contact with, be flush with) an electrode 17 when the corresponding battery cell 3 is accommodated within the lower casing 5.

Figure 6:
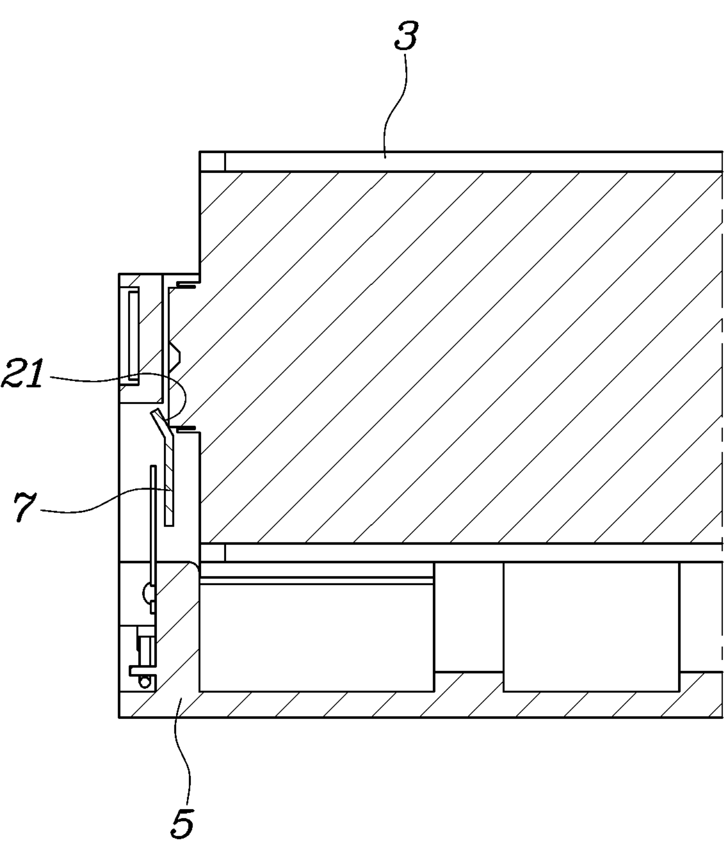
FIG. 6 is a sectional view showing a situation in which the battery cell is guided by an inclined surface of a busbar.
Figure 7:
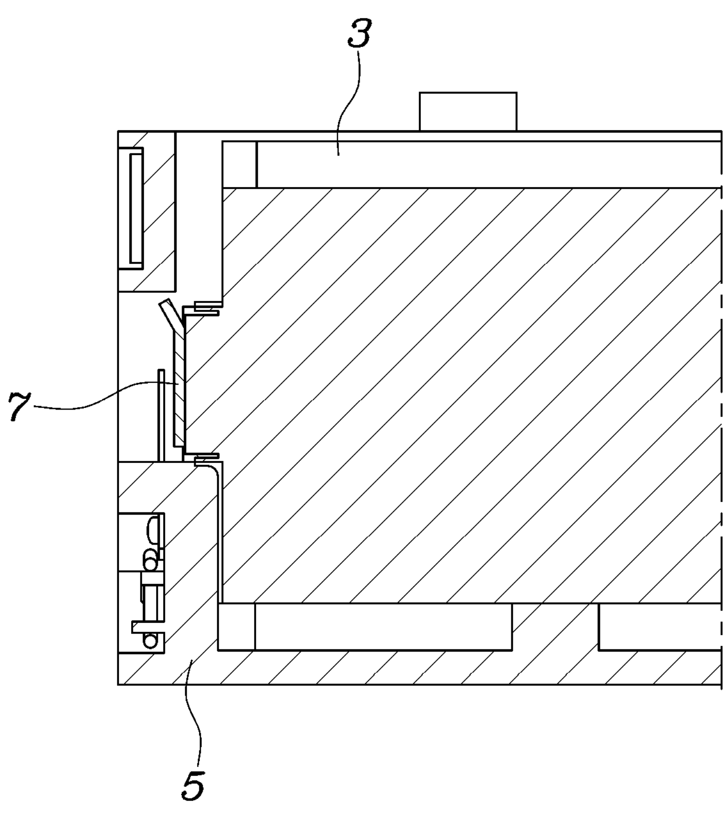
FIG. 7 is a sectional view showing a state in which the battery cell is fully inserted in the lower casing after the situation of FIG. 6.

Therefore, as shown in FIG. 6, as the battery cells 3 are inserted into the lower casing 5, and as the electrodes 17 of the battery cells 3 are guided by the inclined surfaces 21 of the busbars 7, the busbars 7 may be elastically displaced a toward the side wall 19 of the lower casing 5. This may facilitate proper insertion of the battery cells 3. As shown in FIG. 7, a contact state (e.g., flush contact) between the electrodes 17 of the battery cells 3 and the busbars 7 may be achieved.

Once the battery cells 3 are inserted, the busbars 7 and the electrodes 17 may be welded to each other, which may be facilitated by the contact state between the busbars 7 and the electrodes 17 as described above.

One or more outlets 23 may be formed on a lower surface of the lower casing 5, which may allow a fluid (e.g., gas and/or liquid within the battery module 1) to be discharged.

A liquid generated by and/or forming or accumulating in the battery module 1 and/or a gas (e.g., discharged from the battery cells 3) may be discharged through the outlets 23.

In the example, multiple gap-maintaining ribs 11 of the lower casing 5 may be provided in the longitudinal direction of the battery cells 3 when accommodated inside the lower casing 5; and the outlets 23 are respectively arranged between the gap-maintaining ribs 11.

Each of the gap-maintaining ribs 11 may comprise battery side conforming portions 25 and gap portions 27 that may be repeatedly connected to each other, each of the battery side conforming portions 25 may be configured to surround, at least in part, sides of the battery cells 3 accommodated inside the lower casing 5. The gap portions 27 may allow the sides of the two adjacent battery cells 3 to be spaced apart from each other. For example, the in a case of cylindrical battery cells 3, the battery side conforming portions 25 may form circular arcs.

Therefore, when the battery cells 3 are inserted into the lower casing 5, the battery side conforming portions 25 of the gap-maintaining ribs 11 may serve to guide the cylinder portions of the battery cells 3 so that the battery cells 3 are precisely seated inside the lower casing 5 (e.g., mutually aligned and properly spaced, elevated and aligned to make proper contact with the busbars 7, etc.). When the battery cells 3 are situated in the battery side conforming portions 25, the battery side conforming portions 25 may stably hold and support the battery cells 3.

The gaps maintained between adjacent battery cells 3 accommodated inside the lower casing 5 may serve as a path through which gas discharged from the battery cells 3 may be flow to be discharged through outlets 23.

Figure 8:
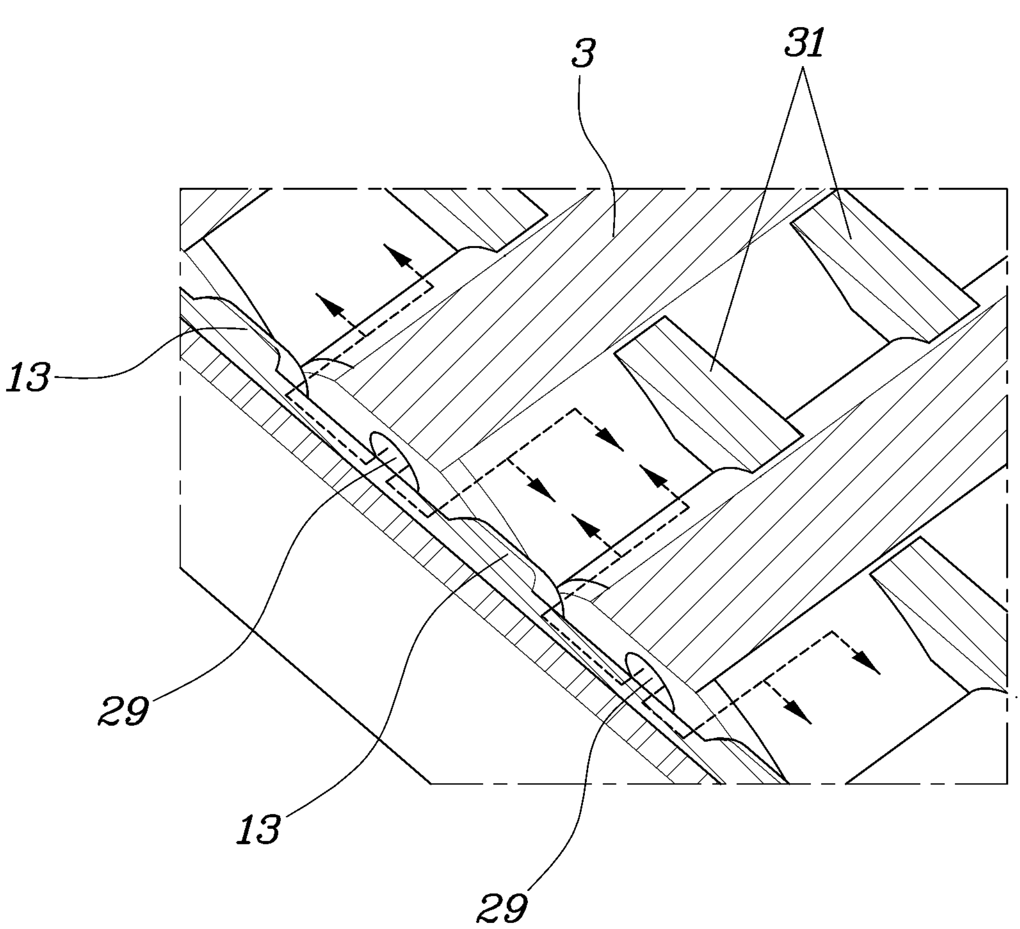
FIG. 8 is a sectional view taken along line VIII-VIII in FIG. 1.
Figure 9:
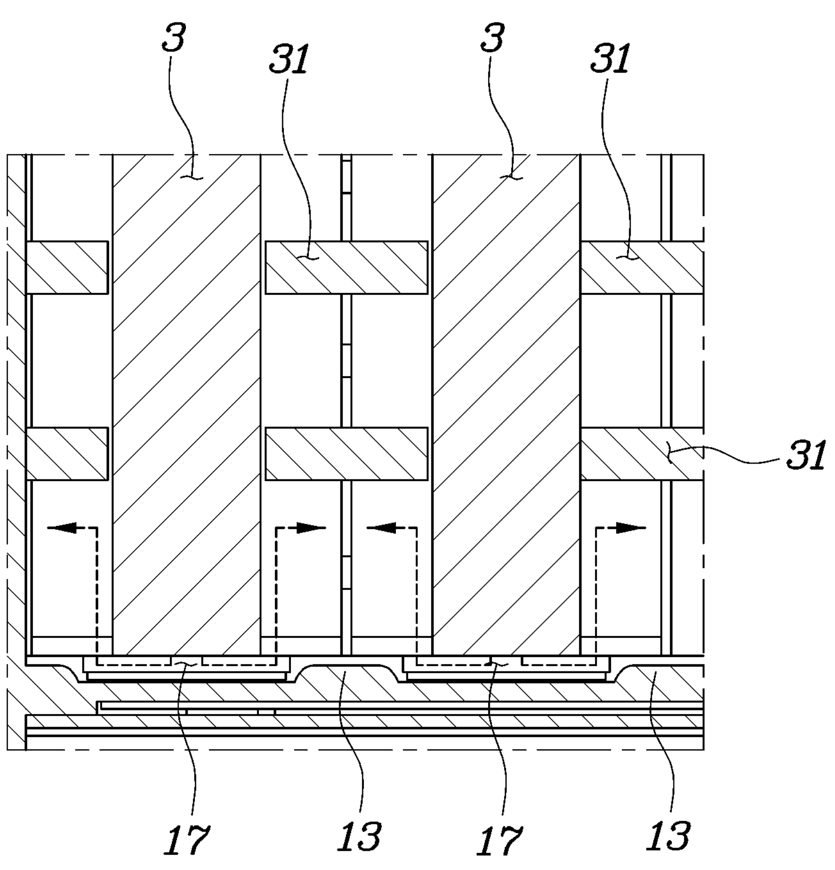
FIG. 9 is a view showing a sectional of FIG. 8 by being taken from vertically above.
Figure 10:
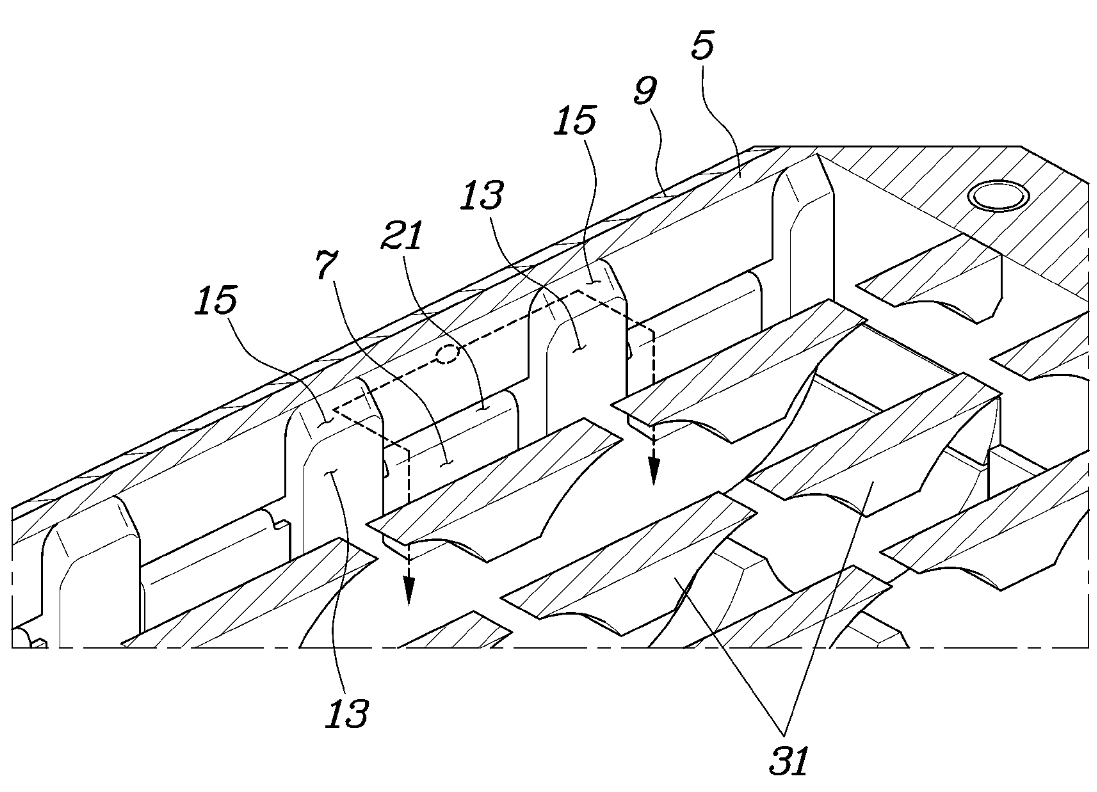
FIG. 10 is a view showing the section of FIG. 8 without the battery cell at a different angle from FIG. 8, the view showing a discharge path of a venting gas with arrows.

As shown in FIGS. 8 to 10, the venting gas discharged from venting holes 29 of the battery cells 3 may move through gaps between the ends of the battery cells 3 and the lower casing 5 and the gaps between the adjacent battery cells 3, e.g., as indicated by the arrows. The gas may be discharged outside of the battery module 1 through the outlets 23.

For reference, FIGS. 8 to 10 show a section taken along line VIII-VIII in FIG. 1, and between the battery cells 3, upper ribs 31, which may be formed (e.g., integrally) in and/or attached to the upper casing 9 are indicated together.

The lower casing 5 may comprise multiple bushes 33, which may be configured to fix the battery module 1, e.g., within a vehicle configured to draw and/or receive power from the battery module 1. The upper casing 9 may have multiple bush holes 35 through which the bushes 33 are configured to penetrate. The bushed 33 may alternately, or additionally, be provided in the upper casing 9, and the bush holes 35 may be correspondingly provided in the lower casing 5.

As shown in FIG. 1, when the battery module 1 is fixed (e.g., to a vehicle body, etc.) the bushes 33 may be used to fix the battery module to the vehicle body (e.g., by bolts, etc.) to achieve easy and firm (e.g., stable, resistant to dislocation) mounting of the battery module 1.

The bushes 33 may be made of a material capable of providing the strength stronger than the lower casing 5, so as to form and maintain the firmly and stably assembled state with the bolts, so that the bushes 33 serve as mediums between the lower casing 5 (which may be formed by, e.g., plastic injection molding) and the bolts.

The lower casing 5 may comprise a voltage sensor 37 for measuring a cell voltage of each of the battery cells 3 accommodated inside the lower casing. The voltage sensor 37 may be configured to be electrically connected to cell voltage measuring terminals 39, which may be respectively connected to the busbars 7.

The upper casing 9 may comprise an upper surface and side surfaces, the side surfaces being connected to a lower portion of the upper surface and/or integrally formed with the upper surface, so as to be configured to form an internal space with an upper surface and side surfaces of the lower casing 5. The side surfaces of the upper casing 9 may be configured to cover (e.g., surround) outer portions of the side surfaces of the lower casing 5. Thus, the side surfaces of the upper casing 9 may protect the busbars 7, as well as the cell voltage measuring terminals 39 and wires, etc. from outside moisture, foreign material, impact, etc.

A temperature measuring module 41 (e.g., a temperature sensor) may be provided (e.g., inside the lower casing 5) and configured to measure temperatures of and/or near the battery cells 3.

Locking protrusions 43 may be provided (e.g., integrally formed in and/or attached to the upper casing 9). The locking protrusions 43 may be provided on the upper casing 9 and may be configured to be elastically inserted into the lower casing 5 to provide a locked state; and locking holes 45 may be formed in the lower casing 5 so that the locking protrusions 43 may be inserted thereinto and provide the elastically locked state.

Therefore, the battery cells 3 may be inserted into and fixed in the lower casing 5, the upper casing 9 may be assembled, and the locking protrusions 43 may be inserted into the locking holes 45, and thus the assembly of the battery module 1 may be easily and rapidly completed.

The present disclosure is intended to provide a battery module capable of easily and stably mounting cylindrical battery cells therein, of rapidly and easily discharging outward a gas vented from the battery cells, and of being assembled with few parts and through a simple process.

In order to achieve the above objectives, according to one aspect of the present disclosure, a battery module may comprise: a lower casing configured to accommodate a plurality of battery cells adjacent to each other (e.g., with side walls of different battery cells, such as cylindrical walls of cylindrical batteries, being adjacent to each other) and to restrain opposite ends of each of the battery cells; busbars provided in the lower casing and configured to form an electrical connection between the battery cells; and an upper casing configured to couple to the lower casing so as to cover upper portions of the battery cells accommodated inside the lower casing. The lower casing may include gap-maintaining ribs (e.g., integrally formed with the lower casing) configured to maintain gaps between adjacent battery cells accommodated inside the lower casing (e.g., to maintain gaps between the adjacent cylindrical walls of cylindrical battery cells).

Vertical ribs may be provided at a side wall of the lower casing configured to restrain one of the opposite ends of battery cells when accommodated in the lower casing. The vertical ribs may protrude toward an inside space of the side wall in vertically elongated shapes that correspond to the gaps between the battery cells. Upper portions of the vertical ribs may be inclined surfaces of the vertical ribs configured to guide the ends of the battery cells inserted into the lower casing toward the inside space of the lower casing.

Each of the vertical ribs may be positioned to be to a side of electrodes protruding in a longitudinal direction of each of the battery cells.

In order to allow the busbars to be in contact with the opposite ends of the battery cells, multiple busbars may be respectively arranged at the side wall of the lower casing; and inclined surfaces may be respectively provided above the busbars so as to guide the electrodes of the battery cells inserted toward the inside space of the lower casing.

The inclined surfaces of the busbars may be located lower than the inclined surfaces of the vertical ribs.

Each of the inclined surfaces of the busbars may be formed by bending an upper portion of each of the busbars such that the upper portion may be inclined toward an outside space of the side wall of the lower casing; and a lower portion of each of the inclined surfaces of the busbars may be arranged such that as each of the electrodes of the battery cells moves downward along each of the inclined surfaces of the busbars, the lower portion of the busbar inclined surface may elastically move toward the outside space of the side wall while being brought in contact with the electrode.

Multiple outlets may be formed on a lower surface of the lower casing so as to allow a fluid to be discharged.

The gap-maintaining ribs may include multiple gap-maintaining ribs arranged in a longitudinal direction of each of the battery cells accommodated inside the lower casing; and each of the outlets may be arranged at each gap between the gap-maintaining ribs.

Each of the gap-maintaining ribs may include battery side conforming portions and gap portions that may be repeatedly connected to each other, and each of the battery side conforming portion may surround each of the cylinder portions of the battery cells accommodated inside the lower casing, and each of the gap portions may allow cylinder portions of two adjacent battery cells of the battery cells to be spaced apart from each other.

The lower casing may include multiple bushes used to fix the battery module; and the upper casing may have multiple bush holes through which the bushes may penetrate.

The lower casing may include a voltage sensor assembly configured to measure a cell voltage of each of the battery cells accommodated inside the lower casing; and the voltage sensor assembly may be electrically connected to cell voltage measuring terminals respectively connected to the busbars.

A temperature measuring module may be provided inside the lower casing to measure temperatures of the battery cells.

Locking protrusions may be integrally formed in the upper casing so as to be elastically inserted into the lower casing to achieve a locked state; and locking holes may be formed in the lower casing so that the locking protrusions may be inserted into the locking holes to achieve the elastically locked state.

The present disclosure provides the battery module, wherein the cylindrical battery cells can be easily and stably mounted in the battery module, gas produced by the battery cells can be rapidly and easily discharged from the battery module, and the assembly of the battery module uses few parts and a simple process.

Although the above example of the present disclosure has been disclosed for illustrative purposes, those skilled in the art will appreciate that various modifications, additions, and substitutions are possible, without departing from the spirit and scope of the present disclosure.

What is claimed is:

1. A battery module comprising:

a lower casing configured to accommodate battery cells in the lower casing such that a side of each battery cell is adjacent to a side of another battery cell and ends of the battery cells are restrained by a side wall of the lower casing;

busbars provided at the side wall of the lower casing and configured to form an electrical connection between the battery cells when the battery cells are accommodated in the lower casing; and an upper casing configured to be coupled to the lower casing so as to form an internal space for accommodating the battery cells inside the lower casing, wherein the lower casing comprises gap-maintaining ribs configured to maintain gaps between adjacent sides of the battery cells when the battery cells are accommodated inside the lower casing, and wherein the busbars comprise busbar inclined surfaces configured to guide electrode terminals, of battery cells being inserted into the lower casing, away from the side wall of the lower casing.

2. The battery module of claim 1, further comprising vertical ribs provided at the side wall and configured to protrude toward the internal space formed by the lower casing, wherein the vertical ribs are shaped to correspond to gaps between battery cells when the battery cells are accommodated inside the lower casing; and wherein upper portions of the vertical ribs comprise rib inclined surfaces configured to guide battery cells being inserted into the lower casing toward the internal space of the lower casing.

3. The battery module of claim 2, wherein each of the vertical ribs is located to a side of where an electrode terminal of a battery cell would be when the battery cells are accommodated in the lower casing.

4. The battery module of claim 2, wherein the busbar inclined surfaces are provided closer to a bottom surface of the lower casing than the rib inclined surfaces are provided.

5. The battery module of claim 1, wherein each of the busbar inclined surfaces is inclined toward the side wall of the lower casing; and wherein a lower portion of each of the busbar inclined surfaces of the busbars is configured to deform elastically.

6. The battery module of claim 1, wherein the lower casing comprises multiple outlets formed therein.

7. The battery module of claim 6, wherein each of the outlets is arranged to correspond to a gap-maintaining portion of a gap-maintaining rib of the gap-maintaining ribs.

8. The battery module of claim 6, wherein each of the gap-maintaining ribs comprises battery side conforming portions and gap-maintaining portions, with each gap-maintaining portion between adjacent battery side conforming portions of the battery side conforming portions, wherein each of the battery side conforming portions are configured to surround a portion of a cylindrical side of a battery cell of the battery cells accommodated inside the lower casing, and wherein each of the gap-maintaining portions is configured to maintain a gap between sides of adjacent battery cells of the battery cells accommodated in the lower casing.

9. The battery module of claim 1, wherein the lower casing comprises multiple bushes; and the upper casing has multiple bush holes through which the bushes are configured to penetrate.

10. The battery module of claim 1, wherein the lower casing comprises a voltage sensor that is electrically connected to the busbars.

11. The battery module of claim 1, wherein a temperature sensor provided inside the lower casing is configured to measure temperatures of the battery cells.

12. The battery module of claim 1, wherein the upper casing comprises locking protrusions configured to be elastically inserted into locking holes in the lower casing.

13. The battery module of claim 1, wherein the upper casing comprises upper ribs formed between the battery cells when the battery cells are accommodated inside the lower casing.

14. The battery module of claim 1, wherein the upper casing comprises side surfaces configured to cover outer portions of side surfaces of the lower casing so as to protect the busbars.

15. An apparatus comprising:

a first casing portion configured to accommodate battery cells in the first casing portion such that a side of each battery cell is adjacent to a side of another battery cell and ends of the battery cells are restrained by a side wall of the first casing portion;

busbars provided at the side wall of the first casing portion and configured to form an electrical connection between the battery cells when the battery cells are accommodated in the first casing portion; and a second casing portion configured to be coupled to the first casing portion so as to form an internal space for accommodating the battery cells, wherein the first casing portion comprises gap-maintaining ribs configured to maintain gaps between adjacent sides of the battery cells when the battery cells are accommodated inside the first casing portion, and wherein the busbars comprise busbar inclined surfaces configured to guide electrode terminals, of battery cells being inserted into the first casing portion, away from the side wall of the first casing portion.

* * * * *